United States Patent
Chan et al.

(10) Patent No.: US 7,382,612 B2
(45) Date of Patent: Jun. 3, 2008

(54) I/O PORT MODULE REPLACING DEVICE

(75) Inventors: Tien-Ming Chan, Taipei (TW); Hsiang Chen, Taipei (TW)

(73) Assignee: Inventec Corporation, Taipei (TW)

( * ) Notice: Subject to any disclaimer, the term of this patent is extended or adjusted under 35 U.S.C. 154(b) by 341 days.

(21) Appl. No.: 11/138,047

(22) Filed: May 26, 2005

(65) Prior Publication Data

US 2006/0268499 A1    Nov. 30, 2006

(51) Int. Cl.
*H05K 5/00* (2006.01)
*H05K 7/00* (2006.01)

(52) U.S. Cl. .................................. 361/686; 361/683

(58) Field of Classification Search ............... 361/683, 361/725, 727, 731, 732, 733, 686; 439/945, 439/946
See application file for complete search history.

(56) References Cited

U.S. PATENT DOCUMENTS

| | | | | |
|---|---|---|---|---|
| 5,331,509 A | * | 7/1994 | Kikinis | 361/686 |
| 5,923,870 A | * | 7/1999 | Johns et al. | 713/502 |
| 6,404,626 B1 | * | 6/2002 | Low et al. | 361/686 |
| 6,488,542 B2 | * | 12/2002 | Laity | 439/676 |
| 6,552,909 B1 | * | 4/2003 | Liebenow | 361/725 |
| 6,718,408 B2 | * | 4/2004 | Esterberg et al. | 710/62 |
| 6,826,638 B1 | * | 11/2004 | Jaggers et al. | 710/300 |
| 2003/0235029 A1 | * | 12/2003 | Doherty et al. | 361/683 |

\* cited by examiner

*Primary Examiner*—Lisa Lea-Edmonds
*Assistant Examiner*—Anthony M Haughton
(74) *Attorney, Agent, or Firm*—Venable LLP; Raymond J. Ho

(57) ABSTRACT

An I/O port replacing device is disclosed, which is applicable on a computer main body and comprises a mounted frame module, which is mounted to a computer main body and is used as a device for replacing I/O port. The I/O port module replacing device is a mounted frame module with a better and customized connection layout designed to fit the user's position in actual operation for easier change of I/O port connection. Taking advantage of this user-friendlier frame module, users will be able to eliminate extra cost of purchasing unnecessary I/O ports, and make the I/O port installation job easier and faster for them.

3 Claims, 5 Drawing Sheets

I/O PORT MODULE REPLACING DEVICE

BACKGROUND OF THE INVENTION

1. Field of the Invention

The present invention relates to an input/output (I/O) port replacing device module, particularly one making use of improved external extension-slots to make the operation and installation of I/O ports easier and more user-friendly.

2. Description of the Prior Art

With the advancement of the information technology, notebook computers have become an indispensable piece of equipment among an office worker's daily paraphernalia. However, notebook computers of earlier makes usually fall short of meeting the standards and demands of today's ever-changing information and internet-oriented society; various new software and hardware designed to improve the capacity and functions of notebook computers have thus been introduced. For example, to meet the ever-growing task requirements, computer users often have to resort to using added peripherals, though such means as extended ports, to boost up their computers' data processing and communication efficiency and capacity.

Conventional communication port devices are generally presented a peripheral attached to the side of a computer, stressing the ease of use that the user only need to plug the connection port into a specified slot according to instruction, then additional functions and communication capacity are acquired. Some makes claim that the specifications of their port was shared by a number of computer makers and are highly compatible with each other, saving the user's trouble and cost in purchasing various extension slot add-ons.

For conventional portable computers with docking-station structures, inside the main body's chassis there are usually such components as RAM modules, heatsink module, power supply module, storage module, battery module, audio module, etc. When a user need to add or remove software/hardware devices from the computer, he can then replace the inside module in the chassis with more suitable modular kits, and has them installed in the chassis, and furnish them with the first and second compatible upper cases to make it a complete main body. Through the procedure of chassis replaceable, a practically user-friendly instance is thus achieved, e.g. equips it with a replacing slot, with which an USB port can be replaced by an IEEE-1394 one.

Although the multi-purpose I/O Port replacing module device features reliability and quality, as well as cost reduction, and immediate fulfillment of user's requirement, most of the parts inside the chassis are delicate, wherein a more cautious operation in replacing the module needs to be stressed. Moreover, in order to meet the requirement and operation practice, wherein users usually have different information processing requirements on different occasions, frequent disassembly and replacement on the main body is never a good thing, because the device is installed inside an inseparable module, to re-layout the modules will be a time-consuming and demanding work if a new device is to be installed inside; meanwhile, the frequent disassembly and replacement are likely to cause crack, and damage, wherein it is not an device to meet the diversified requirements of the general public.

Accordingly, the present invention can improve the device that is not easy to replace or use, and solve the defects effectively.

SUMMARY OF THE INVENTION

In view of the aforementioned technical problems faced by the prior art, the present invention provides a more user-friendly and flexible external I/O port frame module solution by introducing an I/O replacing module device, which is made for users' real operation position and accessibility, and is intended to reduce the unnecessary I/O port purchase cost, and is made for easier and faster I/O port installation.

In order to achieve the purpose, the present invention is to present an I/O module replacing device, used in a computer main body, which comprises a mounted frame module, to be mounted to the main body and used as an adaptor for I/O port module replacement.

The I/O port module replacing device presented in the present invention uses a better connection method to mount the frame module, attached to the edges of the main body, and achieve the requirements of fast slot replacing, easy assembly and disassembly, and immediate operation.

In order to let the purpose, characteristic, and advantage of the present invention easy to understand, in the following paragraphs we will give examples in a preferred embodiment, as well as illustration supplement, and show in details as follow:

DETAILED DESCRIPTION OF THE PREFERRED EMBODIMENT

Figure 1:
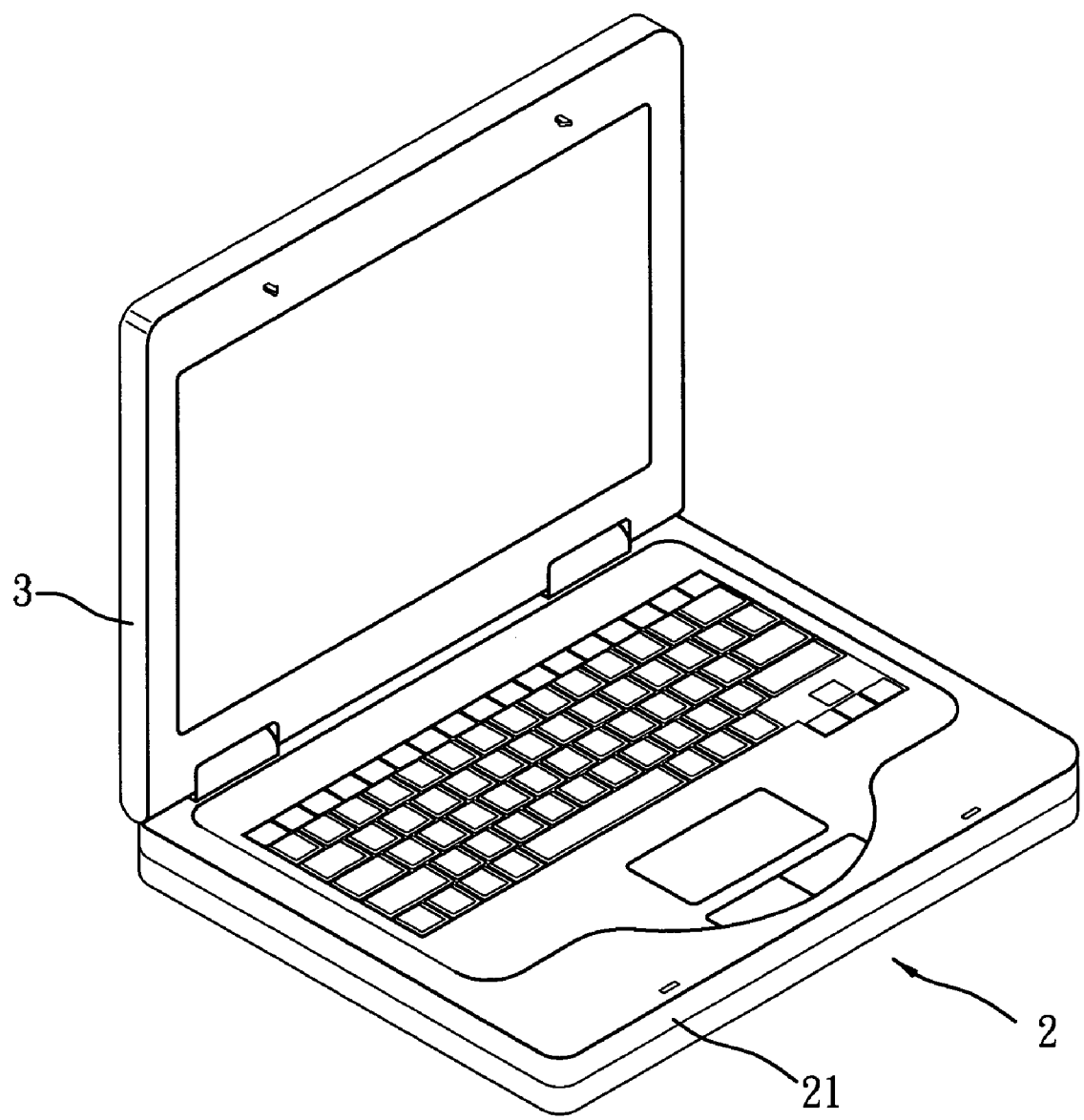
FIG. 1 shows the three-dimensional drawing of the preferred embodiment 1 of the present invention.

FIG. 1 shows a first preferred embodiment of the present invention in its three-dimension illustration; wherein the main body 2, of which the material is either alloy or plastic. The upper half is connected with a liquid crystal display (LCD) display, and the edges of lower half connected with a mounted frame module 21, wherein the mounted frame module 21 is equipped with changeable slot position by design, which is connected to suitable mounted frame module 21, according to user's real equipment requirement; in the meantime, the mounted frame module 21 features easy disassembly and assembly, wherein user may have an easier and faster replacement.

Figures 2A, 2B:
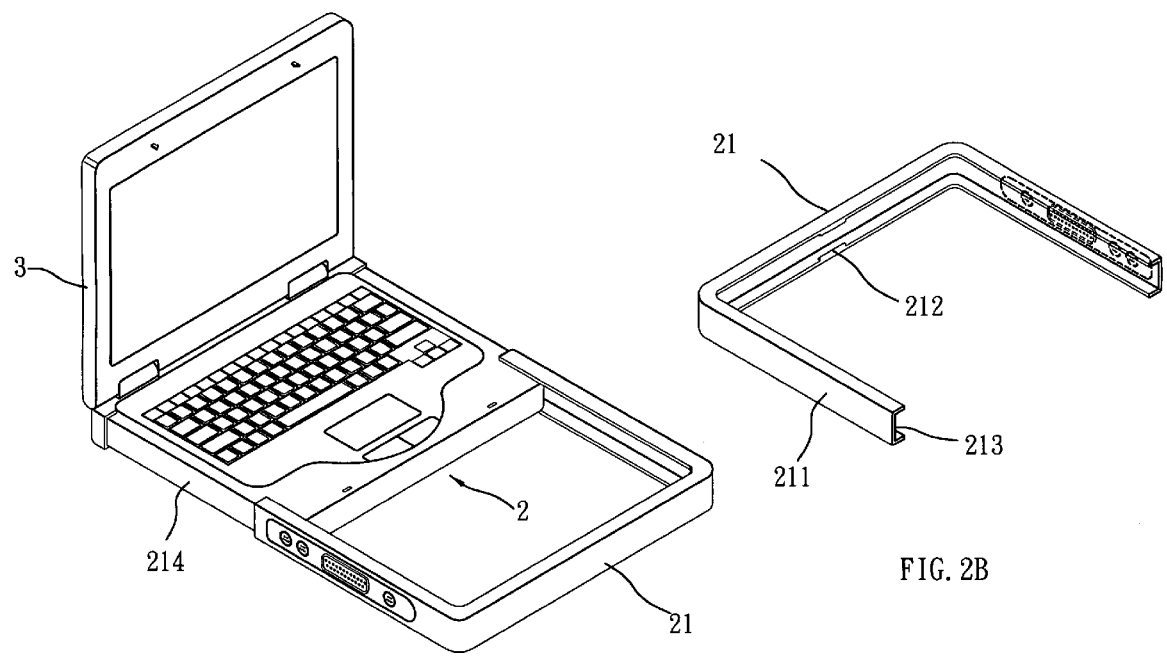
FIG. 2A shows the illustration of the mounted frame module of a first preferred embodiment of the present invention.
FIG. 2B shows the illustration of the I/O replacing module device of a first preferred embodiment of the present invention.

FIG. 2A shows the mounted frame module illustration as in a first preferred embodiment of the present invention; FIG. 2B shows the illustration of the 10 replacing module device of a first preferred embodiment of the present invention. Moreover, FIG. 2B shows the mounted frame module 21 is designed to be a U-shape frame 211, wherein a connection seat opening 212 is located at the center point, and the opening can be aligned with corresponding position on the computer main body 2. The two ends of the connection seat opening 211 are made into clamping ending 213, which can be firmly mounted on the corresponding position of the computer main body. At the time of mounting, slide naturally in along the edge 214 of main body 2, and when replacing, draw it out by the same rule as sliding in; therefore, replacement is more convenient, faster, and easier with the application of mounted frame module 21. In addition, the strength of main body 2 is also upgraded.

Figure 3:
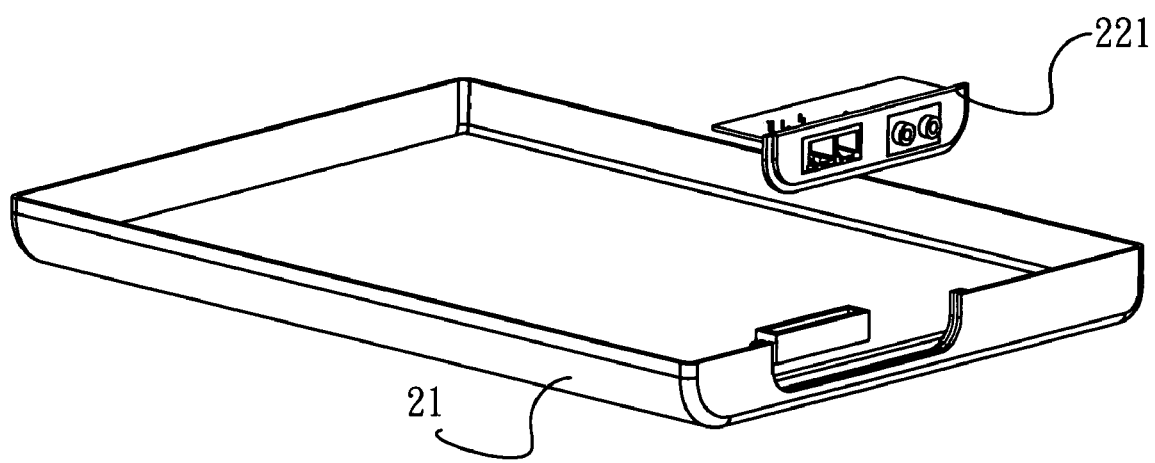
FIG. 3 shows a three-dimensional exploded view of a second preferred embodiment of the present invention.

FIG. 3 shows the three-dimension assembly drawing as in a second preferred embodiment of the present invention. The mounted frame module 21 is in a type of side-panel module 221, with which, at replacement, user need only to mount a suitable side-panel module 221 at the side of main body 2 to finish I/O port slot module replacing. As the side-panel module 221 is a one-piece type, at installation only selecting the suitable slot to replace, the module replacing speed is improved, and no need to disassemble and assemble the main body 2, the risk to damage computer main body is thus reduced.

Figure 4A:
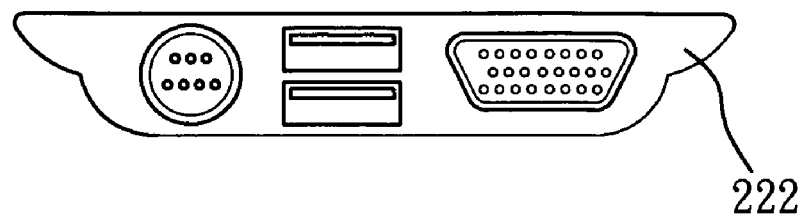
FIG. 4A shows the illustrations of side-panel module layouts with PS/2 port, USB port, serial port of the second preferred embodiment of the present invention.
Figure 4B:
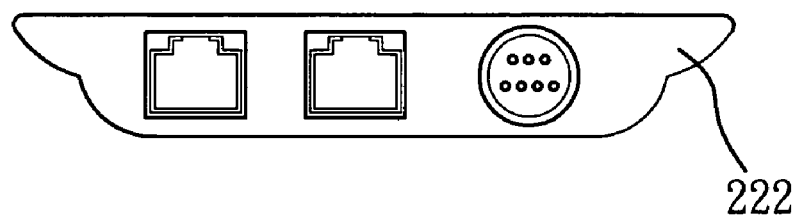
FIG. 4B shows the illustrations of side-panel module layouts with Ethernet LAN port and PS/2 port of the second preferred embodiment of the present invention.
Figure 4C:
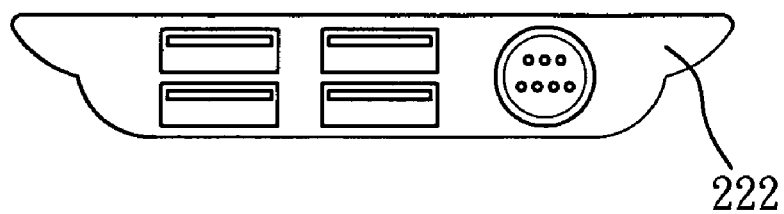
FIG. 4C shows the illustrations of side-panel module layouts with USB port and PS/2 port of the second preferred embodiment of the present invention.

FIG. 4A to FIG. 4C show the illustration of the side-panel module 221 layout types as in the second preferred embodiment of the present invention. The stated layouts are illustrations of three application types, in which if an optimized mounting side-panel module 221 is chosen for side-panel 222 slot layouts, according to user's requirement, then user need only to purchase a frequent-use side-panel module 221, instead of a polarity of slot parts, thus the cost is reduced.

Figure 5:
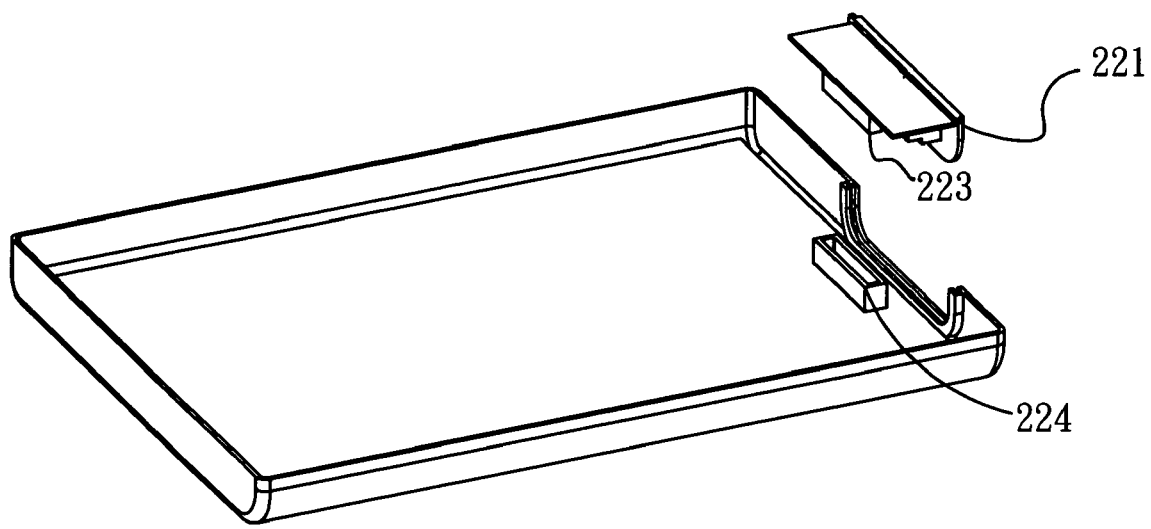
FIG. 5 shows the illustration of side-panel module backside of the second preferred embodiment of the present invention.

FIG. 5 shows the illustration of backside of the side-panel module 221 as in the second preferred embodiment of the present invention. On the backside of the side-panel module 221, an attached piece 223 and clamping piece 224 are firmly inserted and clamped on the edges of main body 2, in which the attached piece 223 and the clamping piece 224 are used to clamp side-panel module 221 firmly to computer main body 2, wherein the attached piece 223 and the clamping piece 224 is either in alloy or plastic.

As shown here, in comparing with the conventional computer I/O port module replacing device, the present invention enjoy the effects of easy replacing, flexibility in use, and dramatic reduction of the cost through improvement of aforementioned complexity in replacing procedure and the high cost of purchasing.

As is understood by a person skilled in the art, the foregoing preferred embodiment of the present invention is an illustration, rather than a limiting description, of the present invention. It is intended to cover various modifications and similar layouts included within the spirit and scope of the appended claims, the scope of which should be accorded the broadest interpretation so as to encompass all such modifications and similar structures.

What is claimed is:

1. An input/output (I/O) port module replacing device used in a computer main body, comprising:

a mounted U-shape frame module mounted onto the computer main body for removable association with the computer main body, the mounted U-shape frame module comprising a U-shape frame, two clamping endings and a connection seat, the two clamping endings perpendicularly extending from two sides of the U-shape frame to clamp the computer main body, the connection seat disposes on the corresponding position of the computer main body to mount the computer main body; and an I/O port module disposed on one side of the U-shape frame for receive a connector.

2. The I/O port module replacing device as in claim 1, wherein the main body is made of alloy.

3. The I/O port module replacing device as in claim 1, wherein the main body is made of plastic.

* * * * *